United States Patent [19]

Beall et al.

[11] 4,341,544
[45] Jul. 27, 1982

[54] METHOD OF MAKING PERALUMINOUS NEPHELINE/KALSILITE GLASS-CERAMICS

[75] Inventors: George H. Beall, Big Flats; Joseph E. Pierson, Painted Post, both of N.Y.

[73] Assignee: Corning Glass Works, Corning, N.Y.

[21] Appl. No.: 294,466

[22] Filed: Aug. 20, 1981

Related U.S. Application Data

[62] Division of Ser. No. 202,739, Oct. 31, 1980, Pat. No. 4,310,595.

[51] Int. Cl.$^3$ .................... C03B 27/02; C03B 32/00; C03C 3/22
[52] U.S. Cl. ........................................ 65/30.14; 65/33
[58] Field of Search ...................... 501/6; 65/30.14, 33

[56] References Cited

U.S. PATENT DOCUMENTS

| | | | |
|---|---|---|---|
| 2,920,971 | 1/1960 | Stookey | 65/33 X |
| 3,573,072 | 3/1971 | Duke et al. | 65/33 X |
| 3,573,073 | 3/1971 | Duke et al. | 65/33 X |
| 3,720,526 | 3/1973 | Duke et al. | 65/33 X |

*Primary Examiner*—Richard V. Fisher

*Attorney, Agent, or Firm*—Clinton S. Janes, Jr.

[57] ABSTRACT

The present invention is concerned with glass-ceramic articles which are extremely resistant to impact and spontaneous delayed breakage, are capable of being sawn with a diamond wheel to a depth of over one-third the cross section thereof without breakage, and exhibit modulus of rupture values of at last 150,000 psi. The articles consist of a body portion and an integral surface compression layer having a depth of at least 0.005". The body portion consists essentially, in weight percent, of about 8–13% $Na_2O$, 7–13% $K_2O$, 30–36% $Al_2O_3$, 35–43% $SiO_2$, and 6–10% $RO_2$, wherein $RO_2$ consists of 6–10% $TiO_2$ and 0–4% $ZrO_2$, wherein the molar ratio $Al_2O_3:SiO_2$ is $>0.5$ but $<0.6$ and the molar ratio $K_2O:Na_2O$ is $>1:3$ but $<1$ and contains nepheline solid solution crystals corresponding to the formula $Na_{8-x}K_x Al_8Si_8O_{32}$, with x varying from 0.25–4.73, as the predominant crystal phase. The surface layer contains kalsilite as the predominant crystal phase and is produced by subjecting the base glass-ceramic article to an ion exchange reaction wherein $K^+$ ions replace at least part of the $Na^+$ ions in the nepheline solid solution crystals to convert those crystals to kalsilite.

2 Claims, No Drawings

METHOD OF MAKING PERALUMINOUS NEPHELINE/KALSILITE GLASS-CERAMICS

This is a division of application Ser. No. 202,739, filed Oct. 31, 1980, now U.S. Pat. No. 4,310,595.

BACKGROUND OF THE INVENTION

As is explained in U.S. Pat. No. 2,920,971, the basic patent in the field of glass-ceramics, such products are prepared through the heat treatment of precursor articles. Thus, the three basic steps underlying the production of glass-ceramics comprise: (1) a glass forming batch, customarily containing a nucleating agent, is melted; (2) the melt is simultaneously cooled to a temperature below the transformation range thereof and a glass article of a desired configuration shaped therefrom; and (3) the glass article is exposed to a predetermined heat treatment schedule to cause the glass to crystallize in situ. Most frequently, this last step is broken down into two parts. First, the parent glass article is initially heated to a temperature in or slightly above the transformation range to develop nuclei in the glass. Thereafter, the glass article is heated to a higher temperature, often above the softening point thereof, to cause the growth of crystals upon the previously-developed nuclei.

Because the mechanism of crystallization involves the essentially simultaneous growth of crystals upon a myriad of previously-developed nuclei, the microstructure of a glass-ceramic product consists of relatively uniformly-sized, fine-grained crystals homogeneously dispersed within a glassy matrix, the crystals comprising the predominant portion of the article. Glass-ceramic articles have been generally defined as being at least 50% crystalline and, in many instances, approach 100% crystallinity. This feature of high crystallinity results in the physical properties exhibited by glass-ceramics being normally materially different from those of the precursor glass and more nearly akin to those demonstrated by the crystals.

The crystal phases developed in a glass-ceramic product are dependent upon the composition of the parent glass and the heat treatment applied to the glass. The term "nepheline" has been utilized in the literature to designate a natural mineral having a crystal structure categorized in the hexagonal crystal system and identified by the general chemical formula (Na,K)AlSiO$_4$. It has been observed in Donnay et al., however, that the mineral nepheline exists in a wide range of solid solutions, the extent of which is not fully elucidated by the above formula (Paper No. 1309 of the Geophysical Laboratory entitled "Nepheline Solid Solutions").

A similar situation exists in the glass-ceramic art where the range of solid solution is even more extensive because the growth of crystals takes place under nonequilibrium conditions. Hence, metastable crystal glasses can be grown. Thus, the term "nepheline" is employed in the glass-ceramic art to indicate a wide range of solid solution crystal phases having general characteristics corresponding to those of the mineral. Accordingly, whereas the crystals may vary substantially in composition, they have a common diffraction peak pattern when studied via X-ray diffraction analysis. In sum, whereas any nepheline crystal will display a characteristic pattern of diffraction peaks, it will be appreciated that the spacing and intensity of the peaks may vary depending upon the nature of the crystal phase.

Research has shown, however, that if potassium ions are substituted for sodium ions in the nepheline crystal, there is a tendency for the nepheline crystal phase to convert, in part at least, to a different type of crystal known as kalsilite. This potassium-containing crystal is also classified in the hexagonal crystal system and, hence, likened to the nepheline system but having a somewhat dissimilar crystal structure, as evidenced by a different pattern of diffraction peaks in an X-ray diffraction pattern analysis. This phenomenon is discussed in "The Nepheline-Kalsilite System: (I.) X-ray Data for the Crystalline Phases", J. V. Smith and O. F. Tuttle, *American Journal of Science*, 255, pp. 282–305, April 1957.

U.S. Pat. No. 3,573,072 described a method for chemically strengthening glass-ceramic articles wherein the predominant crystal phase consists essentially of nepheline solid solutions corresponding generally in chemical composition to the formula Na$_{8-x}$K$_x$Al$_8$Si$_8$O$_{32}$. In that formula x may vary from about 0.25–4.73. The inventive method comprised exposing such glass-ceramic bodies to an external source of K$^+$, Rb$^+$, and/or Cs$^+$ ions at temperatures between about 400°–950° C. for a sufficient length of time to effect replacement of Na$^+$ ions in the nepheline crystals at the surface of bodies with K$^+$, Rb$^+$, and/or Cs$^+$ ions, and thereby convert said nepheline crystals into kalsilite and/or crystals resembling synthetic kaliophylite. That crowding in of the larger K$^+$, Rb$^+$, and/or Cs$^+$ ions into the structure of the nepheline crystals sets up compressive stresses in an integral surface layer on the bodies, thereby imparting much improved mechanical strengths thereto. Customarily, the external source of K$^+$, Rb$^+$, and/or Cs$^+$ ions consisted of a bath of a molten salt containing K$^+$, Rb$^+$, and/or Cs$^+$ ions.

As is explained in that patent, the inventive article consisted of a glass-ceramic having an original nepheline solid solution crystal phase containing K$^+$ and Na$^+$ ions, the ratio of the K$^+$-to-Na$^+$ ions being greater than 0.25:1.75 on an ionic basis, the article being distinguished in having an integral surface layer in which at least a portion of the Na$^+$ ions in the original nepheline phase is replaced by the larger K$^+$, Rb$^+$, and/or Cs$^+$ ions to develop a surface layer of modified chemical composition having a degree of compressive stress generated therein by the ion replacement. The exchange of Na$^+$ ions with K$^+$, Rb$^+$, and/or Cs$^+$ ions takes place on a one-for-one basis such that the concentration of the larger cations is greater in the surface layer than in the interior portion of the article and the concentration of the Na$^+$ ions is greater in the interior portion than in the surface layer, those differences in concentration causing the nepheline crystal structure to expand and transform to a crystal phase with a larger unit cell volume, viz., kalsilite, thereby setting up compressive stresses.

The presence of nepheline and kalsilite solid solutions was detected by means of X-ray diffraction analyses, permitting at least a qualitative estimate of the relative proportion of each in a particular glass-ceramic article. It was also observed that the various ions, and especially the alkali metal ions, tended to appear in the crystal phase in essentially the same proportion as present in the parent glass composition. Finally, where a greater proportion of K$^+$ ions is present than that indicated in the above formula, a different type of crystal, viz., kaliophylite, tends to develop as the original crystal phase in the glass-ceramic.

The patent emphasized that the ratio of $K^+$ ions-to-$Na^+$ ions on an ionic basis in the parent glass must be at least 0.25:1.75 and, preferably, greater than 1:4, in accordance with the above-cited ionic formulation. In the latter instance, an increase in mechanical strength, utilizing a $K^+$-for-$Na^+$ ion exchange, can be achieved at temperatures between about 400°–600° C. within 24 hours. Higher temperatures may be employed, however, to increase the rate of exchange, if desired. Modulus of rupture values of 200,000 psi were observed when an exchange temperature of 730° C. was utilized. The exchange of $Rb^+$ and/or $Cs^+$ ions for $Na^+$ ions required higher temperatures, i.e., 750°–950° C., to attain the desired improved mechanical strengths. Glass compositions operable in the patented invention consisted essentially, expressed in weight percent on the oxide basis, of about 1–15% $K_2O$, 5–20% $Na_2O$, 25–50% $Al_2O_3$, 25–50% $SiO_2$, and 5–15% $TiO_2$.

SUMMARY OF THE INVENTION

Although the improvement in mechanical strength resulting from the method disclosed in U.S. Pat. No. 3,573,072 was readily reproducible, catastrophic failure was easily induced via notching the surface or through modest point impact. Moreover, the strengthened articles were frequently the subject of spontaneous delayed breakage resulting from delayed flow propagation, presumably due to stress corrosion effects from humid environments. It was postulated that thin surface compression layers were more vulnerable to those effects and in the patented products the depth of the compression layer did not exceed about 0.003″ (~75 microns) in the articles demonstrating very high strengths. Ion exchange treatments at temperatures above 730° C. were investigated but the strengths resulting therefrom were not very high, the cause therefore being conjectured as involving viscous relaxation effects at those temperatures.

One significant feature observed via electron microscopy and X-ray diffraction in the glass-ceramic articles disclosed in U.S. Pat. No. 3,573,072 is the substantial quantity of residual glass phase therein. Hence, even when the precursor glass composition was near the actual stoichiometry of nepheline, the nepheline solid solution crystallized in situ comprised only about two-thirds of the volume of the glass-ceramics. Thus, it seems evident that the composition of the nepheline solid solution crystals was substantially different from that of the glass. Inasmuch as the literature indicates that the proportions of $Al_2O_3$ and $SiO_2$ do not vary appreciably in the nepheline compositions, the alkali metal oxides $Na_2O$ and $K_2O$ are believed to be partitioning differently in the crystal and in the glass. Microscopic study of the products determined that those compositions having higher levels of $K_2O$ contained more glassy phase. Accordingly, it is hypothesized that the nepheline solid solution crystals are richer in the $NaAlSiO_4$ nepheline component and the glass is proportionately richer in $KAlSiO_4$.

The primary objective of the present invention is to develop, through chemical strengthening, glass-ceramic articles containing nepheline solid solution crystals corresponding generally in chemical composition to the formula $Na_{8-x}K_xAl_8Si_8O_{32}$ having a much deeper surface compression layer than the products of U.S. Pat. No. 3,573,072 without loss of mechanical strength. It was hypothesized that this objective might be accomplished in two ways. First, removing or at least reducing the amount of residual glassy phase in the glass-ceramic, this glass being the major source of stress relaxation via viscous flow. Second, significantly raising the strain point of the residual glass through alteration of its composition in order to produce a more polymerized network. Either of these accomplishments would permit maintenance of high compressive stresses at temperatures where diffusion kinetics would allow the development of deep surface layers of kalsilite.

The first proposal, viz., to remove or reduce the amount of residual glass, was not deemed to be practical. Potassium aluminosilicate glasses are among the most thermally stable, i.e., they do not crystallize easily at temperatures below about 1200° C. Consequently, this invention is directed toward modifying the composition of the residual glass such that it would exhibit a strain point at temperatures above 800° C.

We have discovered that the strain point of the residual glass can be raised to levels above 800° C. by increasing the molar ratio of $Al_2O_3$ to $SiO_2$ such that it is greater than 0.5 (the ratio of $Al_2O_3:SiO_2$ in classic nepheline). Whereas any increase in $Al_2O_3$ content will effect a rise in the strain point of the residual glass, laboratory work has indicated that a molar ratio $Al_2O_3:SiO_2$ of at least 0.51 is necessary to demonstrate a dramatic effect. However, to insure the desired extensive crystallization of nepheline solid solution, the molar ratio $Al_2O_3:SiO_2$ will not be permitted to exceed about 0.6.

When the molar ratio $K_2O:Na_2O$ is raised above that existing in classic nepheline, i.e., about 1:3, the amount of residual glass present in the glass-ceramic article increases but, with the increased $Al_2O_3$ content, the glass remains stiff, i.e., resistant to flow at temperatures of 850° C. and higher. Nevertheless, as the $K_2O$ content is raised, there is an increasing tendency for clustering of the crystals into loose spherulites. Consequently, a molar ratio $K_2O:Na_2O$ of 1 is deemed to be a practical maximum. Furthermore, at that $K_2O$ level the liquidus temperature becomes very high.

A study of the mechanism underlying the crystallization in situ of $TiO_2$-nucleated glass-ceramic articles containing nepheline solid solution as the predominant crystal phase has elucidated the following sequence: (1) amorphous phase separation with isolation of titanium-rich islands; (2) separation of anatase ($TiO_2$) nuclei; (3) nucleation of metastable carnegieite crystals upon those nuclei; and (4) the transformation of the carnegieite crystals to nepheline solid solution crystals. Examination of photomicrographs has indicated that primary grain growth of carnegieite takes place rapidly within one hour at 850° C. with crystal sizes less than 0.1 micron at impingement. The transformation into nepheline solid solution crystals can occur within two-to-three hours at 850° C. and in less than one hour at 900° C. It appears that very little grain growth accompanies this transformation. That circumstance differs greatly from the five-to-ten fold increase in crystal size demonstrated through the conversion of metastable $\beta$-quartz solid solutions to $\beta$-spodumene solid solutions in the commercially-marketed, low expansion glass-ceramics.

As is well-recognized in the glass-ceramic art, crystallization proceeds more rapidly at higher temperatures. However, in the present nepheline solid solution-containing compositions, crystallization at temperatures above 1050° C. appears to result in substantial secondary grain growth. For example, after an exposure of four hours at 1100° C., the crystals had increased in size to 0.5 micron. Laboratory experience has demonstrated that greater mechanical strengths through chemical strengthening can be achieved in the instant glass-ceramic where the crystal size is maintained very fine-grained. Accordingly, crystallization temperatures no greater than about 1050° C. will be utilized. To insure a more uniformly-sized, fine-grained crystallization, a nucleation step at temperatures between about 700°–800° C. will commonly be employed.

The cause of this improved mechanical strength is not fully understood. However, it is believed that diffusion of $K^+$ ions from a bath of a molten potassium salt or other source of $K^+$ ions is more sluggish in the nepheline crystal lattice than in the more open and less dense glassy phase or along grain boundaries. If, indeed, diffusion of $K^+$ ions into the nepheline crystal lattice is sluggish, reduced crystal sizes will permit more efficient exchange of $K^+$-for-$Na^+$ ions. Moreover, electron microscopy examination of the ion exchange boundary (the interface between nepheline solid solution crystals and the kalsilite resulting from the chemical strengthening process) has evidenced at least a suggestion of zoning of kalsilite around individual nepheline solid solution crystals. Where the crystals have diameters no greater than about 0.1 micron, such zoning would be of less practical significance and greater utilization of the surface compression provided by the ion exchange reaction can be realized.

Both nepheline and kalsilite are stuffed derivations of the silica polymorph tridymite in that each is derived from that structure by replacing every second silicon ion with an aluminum ion and providing for the necessary charge balance by stuffing sodium or potassium ions into the interstitial vacancies located along hexagonal channels parallel to the c-axis. However, the structure of kalsilite is more open than that of nepheline, i.e., the unit cell volume of kalsilite is greater than that of nepheline, such that the transformation of nepheline to kalsilite induced by the ion exchange reaction results in an increase of volume. For example, the change in volume for the transformation of potassic nepheline ($Na_3$-$KAl_4Si_4O_{16}$) to kalsilite ($KAlSiO_4$) is about 8.2%, a very substantial increase for a displacive or non-reconstructive type of transformation. This expansion, which results from the chemical strengthening ion exhange reaction of $K^+$ ions for $Na^+$ ions, produces a highly expanded surface structure without any breaking of network Si-O or Al-O bonds. As a consequence, high compressive stress can be generated in a surface layer with no weak or broken-bonded interface being formed during the transformation of nepheline to kalsilite or being "frozen in" upon cooling after termination of the ion exchange reaction.

As was observed above, the chemically strengthened glass-ceramic products disclosed in U.S. Pat. No. 3,573,072 were frequently subject to spontaneous delayed breakage, this failing being the result of a relatively thin surface compression layer (~3 mils). Attempts to develop deeper surface layers by conducting the ion exchange at higher temperatures led to significant losses in mechanical strength.

The present inventive method provides nepheline solid solution-containing glass-ceramic articles with thick (>0.005" and, preferably, >0.015") surface compression layers which demonstrate abraded modulus of rupture values in excess of 150,000 psi and, preferably, greater than 200,000 psi. The articles are extremely resistant to impact and to spontaneous delayed breakage. For example, rods of the inventive materials have been sawn with a diamond wheel to a depth of over one-third the cross section thereof and, in some instances, over one-half of their diameter and subsequently held for weeks under ambient humid conditions without breaking. Other sawn rods were exposed in an autoclave for three days operating at 300° C. under saturated steam (1250 psig) with no breakage occurring.

Three factors undergird the operability of the instant invention:

First, the composition of the precursor glass body must be so designed that, upon crystallization in situ to a glass-ceramic, the residual glass will exhibit a strain point in excess of 800° C.;

Second, the crystallization of the parent glass body will be conducted at temperatures no higher than about 1050° C., preferably 900°–1050° C., so that the crystals developed will be no greater than about 0.5 micron in diameter; and Third, an ion exchange reaction involving the replacement of $Na^+$ ions with $K^+$ ions will be carried out at temperatures in excess of 800° C., normally 800°–900° C. and, preferably, in the vicinity of 850° C.

(An explanation for relying upon "abraded strength" measurements to indicate the practical mechanical strength of chemically strengthened glass-ceramics and a description of a laboratory method for determining "abraded strength" values are reported in U.S. Pat. No. 3,573,072.)

The base composition of the precursor glass will approximate the stoichiometry of nepheline but the molar ratio $Al_2O_3:SiO_2$ will be greater than 0.5, commonly 0.51–0.6, and the molar ratio $K_2O:Na_2O$ will exceed 1:3 but will not be greater than 1. With those constraints, operable glass compositions consist essentially, as expressed in weight percent on the oxide basis, of about 8–13% $Na_2O$, 7–13% $K_2O$, 30–36% $Al_2O_3$, 35–40% $SiO_2$, and 6–10% $RO_2$, wherein $RO_2$ consists of 6–10% $TiO_2$ and 0–4% $ZrO_2$.

DESCRIPTION OF THE PREFERRED EMBODIMENTS

Table I reports a number of glass batches, reported in terms of parts by weight on the oxide basis as calculated from the batch ingredients, illustrating the composition parameters of the instant invention. Inasmuch as the sum of the individual components totals or approximately totals 100, for all practical purposes the compositions may be deemed to have been recorded in terms of weight percent. The actual batch ingredients may comprise any materials, either the oxide or other compound, which, when melted together, will be converted into the desired oxide in the proper proportions.

The batches were compounded, dry ballmilled together to assist in securing a homogeneous melt, and placed into platinum crucibles. The crucibles were introduced into a furnace operating at 1650° C. and the batches melted for 16 hours with stirring. 0.25" diameter cane was formed on an updraw and the remainder of the melts poured into steel molds to produce slabs having the approximate dimensions of 6"×6"×0.5". The slabs were immediately transferred to an annealer operating at 700° C.

TABLE I

| | 1 | 2 | 3 | 4 | 5 | 6 | 7 | 8 | 9 |
|---|---|---|---|---|---|---|---|---|---|
| $SiO_2$ | 38.0 | 38.0 | 41.0 | 37.0 | 39.0 | 37.0 | 37.0 | 38.0 | 37.0 |
| $Al_2O_3$ | 34.0 | 34.0 | 31.0 | 35.0 | 34.0 | 35.0 | 34.0 | 34.0 | 35.0 |
| $Na_2O$ | 12.0 | 11.0 | 11.0 | 11.0 | 11.0 | 11.0 | 9.0 | 11.0 | 11.0 |

TABLE I-continued

| | | | | | | | | | |
|---|---|---|---|---|---|---|---|---|---|
| $K_2O$ | 8.0 | 10.0 | 9.0 | 9.0 | 9.0 | 10.0 | 12.0 | 9.0 | 9.0 |
| $TiO_2$ | 8.0 | 7.0 | 8.0 | 8.0 | 7.0 | 7.0 | 8.0 | 8.0 | 8.0 |
| $As_2O_5$ | 0.5 | 0.5 | 0.5 | 0.5 | 0.5 | 0.5 | 0.5 | 0.5 | 0.5 |

| | 10 | 11 | 12 | 13 | 14 | 15 | 16 | 17 | 18 |
|---|---|---|---|---|---|---|---|---|---|
| $SiO_2$ | 39.0 | 39.0 | 38.0 | 40.0 | 38.0 | 37.0 | 38.0 | 38.0 | 37.8 |
| $Al_2O_3$ | 34.0 | 34.0 | 34.0 | 30.0 | 35.0 | 34.0 | 34.0 | 34.0 | 33.8 |
| $Na_2O$ | 11.0 | 12.0 | 12.0 | 11.0 | 11.0 | 10.0 | 10.0 | 9.0 | 11.9 |
| $K_2O$ | 9.0 | 8.0 | 9.0 | 8.0 | 9.0 | 11.0 | 11.0 | 12.0 | 8.0 |
| $TiO_2$ | 7.0 | 7.0 | 7.0 | 7.0 | 7.0 | 8.0 | 7.0 | 7.0 | 8.0 |
| $As_2O_5$ | 0.5 | 0.5 | 0.5 | 0.5 | 0.5 | 0.5 | 0.5 | 0.5 | 0.5 |
| $ZrO_2$ | — | — | — | — | — | — | — | — | — |

| | 19 | 20 | 21 |
|---|---|---|---|
| $SiO_2$ | 38.0 | 38.0 | 38.0 |
| $Al_2O_3$ | 34.0 | 34.0 | 34.0 |
| $Na_2O$ | 11.0 | 11.0 | 12.0 |
| $K_2O$ | 10.0 | 10.0 | 8.0 |
| $TiO_2$ | 6.0 | 5.0 | 7.0 |
| $As_2O_5$ | 0.5 | 0.5 | 0.5 |
| $ZrO_2$ | 2.0 | 3.0 | 2.0 |

Although the above exemplary compositions represent laboratory melts, it will be appreciated that the recited batches could be melted in large scale commercial units. $TiO_2$ is included as a nucleating agent and $As_2O_5$ performs its customary function as a fining agent.

Table II reports crystallization schedules applied to cane samples and/or to rod samples of 0.25" cross section cut from annealed slabs of the above glasses. The general practice involved placing the samples into an electrically-fired furnace, heating the samples at about 300° C./hour to the first temperature dwell, further heating the samples at furnace rate to the second temperature hold, and then cooling at furnace rate to 400°–500° C., opening the furnace door ajar, and cooling to room temperature.

Table II also records the chemical strengthening parameters applied to the samples. K+ ions were provided by a molten salt mixture of 52% by weight KCl and 48% $K_2SO_4$. The salt was melted and held in 96% silica containers, marketed by Corning Glass Works, Corning, N.Y. under the trademark VYCOR. The molten salt attacks such metals as stainless steel.

Finally, Table II lists modulus of rupture measurements carried out in the conventional manner on the cane and rod samples. In each instance, the samples were abraded before being tested.

TABLE II

| Example | Crystallization Treatment | Strengthening Treatment | Modulus of Rupture |
|---|---|---|---|
| 1 | 720° C. for 4 hours<br>1025° C. for 4 hours | 850° C. for 8 hours | 202,000 psi |
| 1 | 760° C. for 4 hours<br>1025° C. for 4 hours | 850° C. for 8 hours | 211,000 psi |
| 2 | 760° C. for 4 hours<br>990° C. for 4 hours | 850° C. for 8 hours | 207,000 psi |
| 2 | 760° C. for 4 hours<br>1025° C. for 4 hours | 850° C. for 24 hours | 182,000 psi |
| 2 | 760° C. for 4 hours<br>1050° C. for 4 hours | 850° C. for 8 hours | 207,000 psi |
| 2 | 800° C. for 4 hours<br>1025° C. for 4 hours | 850° C. for 8 hours | 217,000 psi |
| 2 | 760° C. for 4 hours<br>990° C. for 4 hours | 850° C. for 8 hours | 192,000 psi |
| 3 | 800° C. for 4 hours<br>990° C. for 4 hours | 850° C. for 8 hours | 110,000 psi |
| 3 | 800° C. for 4 hours<br>990° C. for 4 hours | 850° C. for 24 hours | 74,000 psi |
| 4 | 760° C. for 4 hours<br>1025° C. for 4 hours | 850° C. for 8 hours | 199,000 psi |
| 5 | 760° C. for 4 hours<br>990° C. for 4 hours | 850° C. for 8 hours | 173,000 psi |
| 5 | 760° C. for 4 hours<br>1025° C. for 4 hours | 850° C. for 8 hours | 154,000 psi |
| 5 | 760° C. for 4 hours<br>1025° C. for 4 hours | 850° C. for 24 hours | 155,000 psi |
| 6 | 760° C. for 4 hours<br>990° C. for 4 hours | 850° C. for 8 hours | 178,000 psi |
| 6 | 760° C. for 4 hours<br>1025° C. for 4 hours | 850° C. for 8 hours | 202,000 psi |
| 6 | 760° C. for 4 hours<br>1050° C. for 4 hours | 850° C. for 8 hours | 210,000 psi |
| 7 | 760° C. for 4 hours<br>950° C. for 4 hours | 850° C. for 8 hours | 206,000 psi |
| 7 | 760° C. for 4 hours<br>1025° C. for 4 hours | 850° C. for 8 hours | 219,000 psi |
| 8 | 760° C. for 4 hours<br>1025° C. for 4 hours | 850° C. for 8 hours | 186,000 psi |
| 9 | 760° C. for 4 hours<br>1025° C. for 4 hours | 850° C. for 8 hours | 172,000 psi |
| 10 | 760° C. for 4 hours<br>1025° C. for 4 hours | 800° C. for 8 hours | 214,000 psi |
| 10 | 760° C. for 4 hours<br>1025° C. for 4 hours | 800° C. for 24 hours | 187,000 psi |
| 10 | 760° C. for 4 hours<br>1025° C. for 4 hours | 850° C. for 8 hours | 181,000 psi |
| 10 | 760° C. for 4 hours<br>1025° C. for 4 hours | 870° C. for 8 hours | 160,000 psi |
| 10 | 760° C. for 4 hours<br>1025° C. for 4 hours | 890° C. for 8 hours | 144,000 psi |
| 11 | 760° C. for 4 hours<br>990° C. for 4 hours | 850° C. for 8 hours | 194,000 psi |
| 11 | 760° C. for 4 hours<br>1025° C. for 4 hours | 850° C. for 24 hours | 177,000 psi |
| 11 | 760° C. for 4 hours<br>1050° C. for 4 hours | 850° C. for 8 hours | 188,000 psi |
| 12 | 760° C. for 4 hours<br>990° C. for 4 hours | 850° C. for 8 hours | 174,000 psi |
| 12 | 760° C. for 4 hours<br>1025° C. for 4 hours | 850° C. for 8 hours | 165,000 psi |
| 13 | 800° C. for 4 hours<br>1025° C. for 4 hours | 850° C. for 8 hours | 172,000 psi |
| 13 | 720° C. for 4 hours<br>1025° C. for 4 hours | 850° C. for 8 hours | 152,000 psi |
| 13 | 760° C. for 4 hours<br>990° C. for 4 hours | 850° C. for 8 hours | 168,000 psi |
| 14 | 760° C. for 4 hours<br>990° C. for 4 hours | 850° C. for 8 hours | 174,000 psi |
| 15 | 760° C. for 4 hours<br>1025° C. for 4 hours | 850° C. for 8 hours | 200,000 psi |
| 16 | 760° C. for 4 hours<br>1025° C. for 4 hours | 850° C. for 8 hours | 188,000 psi |
| 17 | 760° C. for 4 hours<br>1025° C. for 4 hours | 850° C. for 8 hours | 174,000 psi |
| 18 | 760° C. for 4 hours<br>1025° C. for 4 hours | 850° C. for 8 hours | 210,000 psi |
| 19 | 750° C. for 4 hours<br>1025° C. for 4 hours<br>1050° C. for 4 hours | 850° C. for 8 hours | 205,000 psi |
| 20 | 750° C. for 4 hours<br>1025° C. for 4 hours<br>1050° C. for 4 hours | 850° C. for 8 hours | 186,000 psi |
| 21 | 750° C. for 4 hours<br>1025° C. for 4 hours<br>1050° C. for 4 hours | 850° C. for 8 hours | 203,000 psi |

As noted above, the depth of the surface compression layer developed is a function of the time and temperature of the ion exchange treatment. The determination of an operable schedule to produce such a layer having a depth of at least 0.005" is well within the technical ingenuity of the worker of ordinary skill in the art. In general, crystallization of the parent glass to a glass-ceramic will involve nucleation of about 780°–800° C. for about 2–8 hours followed by crystallization at 900°–1050° C. for about 4–24 hours.

That composition of the base precursor glass is critical and can be seen from an examination of Example 3.

Likewise, the need for holding the temperature for ion exchange below 900° C. is evidenced in Example 10.

We claim:

1. A method for making a glass-ceramic article which is extremely resistant to impact and spontaneous delayed breakage, is capable of being sawn with a diamond wheel to a depth of over one-third the cross section thereof without breakage, and exhibits a modulus of rupture of at least 150,000 psi, said article consisting of a body portion and an integral surface compression layer having a thickness of at least 0.005", said method comprising the steps of:

(a) melting a batch for a glass consisting essentially, expressed in weight percent on the oxide basis, of about 8–13% $Na_2O$, 7–13% $K_2O$, 30–36% $Al_2O_3$, 35–43% $SiO_2$, and 6–10% wherein $RO_2$ consists of 6–10% $TiO_2$ and 0–4% $ZrO_2$, wherein the molar ratio $Al_2O_3:SiO_2$ is $>0.5$ but $<0.6$ and the molar ratio $K_2O:Na_2O$ is $>1:3$ but $<1$;

(b) simultaneously cooling said melt to a temperature at least below the transformation range thereof and shaping a glass article therefrom;

(c) heat treating said glass article at a temperature between about 900°–1050° C. for a sufficient length of time to crystallize said glass article in situ to a glass-ceramic article wherein crystals not exceeding about 0.5 micron in diameter of nepheline solid solution corresponding to the formula $Na_{8-x}K_x$-$Al_8Si_8O_{32}$, with x varying from 0.25–4.73, constitute the predominant crystal phase; and (d) contacting said glass-ceramic article with a source of $K^+$ ions at a temperature between about 800°–900° C. for a sufficient length of time to replace at least part of the $Na^+$ ions of said nepheline solid solution with $K^+$ ions to a depth within said glass-ceramic article of at least 0.005", thereby converting said nepheline solid solution to kalsilite and effecting an integral compressively stressed surface layer on said article.

2. A method according to claim 1 wherein the said glass article is first heated to about 700°–800° C. for a sufficient length of time to develop nuclei therein prior to heat treating at 900°–1050° C.

* * * * *